(12) United States Patent
Kim et al.

(10) Patent No.: US 11,230,159 B2
(45) Date of Patent: Jan. 25, 2022

(54) COOLING AND HEATING CABINET

(71) Applicant: LG Electronics Inc., Seoul (KR)

(72) Inventors: Taekyung Kim, Seoul (KR); Sungbae Song, Seoul (KR); Younggyu Jung, Seoul (KR); Joongkeun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 16/482,958

(22) PCT Filed: Feb. 1, 2018

(86) PCT No.: PCT/KR2018/001399
§ 371 (c)(1),
(2) Date: Aug. 1, 2019

(87) PCT Pub. No.: WO2018/143699
PCT Pub. Date: Aug. 9, 2018

(65) Prior Publication Data
US 2020/0231020 A1 Jul. 23, 2020

(30) Foreign Application Priority Data
Feb. 1, 2017 (KR) .................. 10-2017-0014464

(51) Int. Cl.
*B60H 1/00* (2006.01)
*A47J 39/00* (2006.01)
(Continued)

(52) U.S. Cl.
CPC ........ *B60H 1/00592* (2013.01); *A47J 39/003* (2013.01); *B01F 13/0863* (2013.01);
(Continued)

(58) Field of Classification Search
CPC ...... B60H 1/00592; B60H 1/00; A47J 39/003; B01F 13/0863; B01F 15/066;
(Continued)

(56) References Cited

U.S. PATENT DOCUMENTS 3,733,836 A 5/1973 Corini
5,111,664 A 5/1992 Yang
(Continued)

FOREIGN PATENT DOCUMENTS

CN 1047730 12/1990
CN 1401959 3/2003
(Continued)

OTHER PUBLICATIONS

EP extended European search report, in European Appln. No. 118747655.1, dated Nov. 4, 2020, 10 pages.
(Continued)

*Primary Examiner* — Emmanuel E Duke
(74) *Attorney, Agent, or Firm* — Fish & Richardson P.C.

(57) ABSTRACT

A cooling and heating cabinet according to an embodiment of the present invention may comprise: an inner case having a storage space provided therein; an outer case which is disposed surrounding the inner case and forms an insulation cavity between the outer case and the inner case; a thermoelectric element module disposed in the insulation cavity; a separation panel disposed inside the inner case and having a plurality of through-holes; an agitating part disposed between the separation panel and the bottom surface of the inner case, and having a magnet and an agitating fan that rotates with the magnet; and a magnetic field-generating part disposed outside the outer case, and generating a magnetic field to rotate the magnet.

21 Claims, 9 Drawing Sheets

(51) Int. Cl.
  *B01F 13/08* (2006.01)
  *B01F 15/06* (2006.01)
  *B60N 3/10* (2006.01)
  *F25B 21/02* (2006.01)
  *F25D 31/00* (2006.01)

(52) U.S. Cl.
  CPC ............ *B01F 15/066* (2013.01); *B60N 3/104* (2013.01); *F25B 21/02* (2013.01); *F25D 31/005* (2013.01); *B01F 2015/061* (2013.01); *B01F 2015/062* (2013.01); *F25B 2321/02* (2013.01)

(58) Field of Classification Search
  CPC ......... B01F 2015/061; B01F 2015/062; B60N 3/104; B60N 3/10; F25B 21/02; F25B 21/04; F25B 2321/02; F25B 2321/0251; F25D 31/005; F25D 31/00; F25D 2201/14; F25D 2317/0681; F25D 2317/06
  See application file for complete search history.

(56) References Cited

U.S. PATENT DOCUMENTS

| | | | | |
|---|---|---|---|---|
| 5,533,800 | A | * | 7/1996 | Stiegelmann ....... B01F 13/0818 366/142 |
| 6,832,646 | B1 | | 12/2004 | Uomori et al. |
| 2003/0024264 | A1 | | 2/2003 | Jung et al. |
| 2004/0022123 | A1 | * | 2/2004 | Coville ............... B01F 13/0818 366/273 |
| 2005/0086947 | A1 | * | 4/2005 | Minoura .................. B01L 7/02 62/3.3 |

FOREIGN PATENT DOCUMENTS

| | | |
|---|---|---|
| CN | 202443327 | 9/2012 |
| CN | 103954093 | 7/2014 |
| CN | 104442502 | 3/2015 |
| DE | 29716137 | 12/1997 |
| DE | 102015006560 | 12/2015 |
| DE | 102015006562 | 12/2015 |
| FR | 2435680 | 4/1980 |
| JP | H07218095 | 8/1995 |
| JP | 08014724 | 1/1996 |
| JP | H0814724 | 1/1996 |
| JP | 4132680 | 8/2008 |
| KR | 20070025801 | 3/2007 |
| KR | 100710250 | 4/2007 |
| KR | 100776915 B1 * | 11/2007 |
| KR | 100776915 B9 * | 4/2008 |
| KR | 100845152 | 7/2008 |
| KR | 100883797 | 2/2009 |

OTHER PUBLICATIONS

Office Action in Chinese Appln. No. 201880009865.0, dated May 8, 2021, 17 pages (with English translation).

* cited by examiner

COOLING AND HEATING CABINET

CROSS-REFERENCE TO RELATED APPLICATIONS

This application is a National Stage application under 35 U.S.C. § 371 of International Application No. PCT/KR2018/001399, filed on Feb. 1, 2018, which claims the benefit of Korean Patent Application No. 10-2017-0014464, filed on Feb. 1, 2017. The disclosures of the prior applications are incorporated by reference in their entirety.

TECHNICAL FIELD

The present invention relates to a cooling and heating cabinet, and particularly, to a cooling and heating cabinet having a heat insulation cavity.

BACKGROUND ART

A cooling and heating cabinet is provided with a storage space for storing food therein, so that a temperature of the storage space may be maintained at a low or high temperature according to a user selection. In particular, a cooling and heating cabinet for a vehicle is installed in the interior of a vehicle to temporarily keep drinks and small amounts of food.

Since capacity of the cooling and heating cabinet for a vehicle is relatively small, a cooling method using a thermoelectric element, rather than using a cooling method using circulation of a refrigerant is generally used. The thermoelectric element is an electronically cooled substrate utilizing the Peltier effect. The Peltier effect refers to a phenomenon in which an electrical current passing through a junction between two types of metal absorbs heat at one terminal and generates heat at the other terminal depending on a direction of the current.

According to this cooling method, heat inside the cooling and heating cabinet for a vehicle is absorbed by a heat absorption terminal, and thus, a temperature inside the cooling and heating cabinet may be maintained at a constant temperature or lower. In addition, if the direction of the current flowing through the thermoelectric element is reversed, heat emitted from a heat generation terminal may be transferred to the inside of the cooling and heating cabinet for the vehicle, so that the temperature inside the cooling and heating cabinet may be maintained at a predetermined temperature or higher.

Meanwhile, a cooling part such as a heat dissipation plate or a cooling fan may be provided in the cooling and heating cabinet for a vehicle to cool high temperature heat generated from the heat generation terminal.

However, the cooling and heating cabinet according to the related art has a problem in that time taken for the inside of a refrigerating chamber to reach a target temperature using only the thermoelectric element is long. In addition, cold air falls and warm air rises inside the refrigerating chamber, resulting in that the temperature of the refrigerating chamber is not uniform.

DISCLOSURE

Technical Problem

It is an object of the present invention to provide a cooling and heating cabinet capable of keeping a temperature of a storage space constant.

Another object of the present invention is to provide a cooling and heating cabinet capable of making a temperature of a storage space to be distributed uniformly.

Technical Solution

To solve the technical problem as described above, there is provided a cooling and heating cabinet including: an inner case having a storage space therein; an outer case disposed to surround the inner case, a heat insulation cavity being provided between the outer case and the inner case; a thermoelectric element module disposed in the heat insulation cavity; a separation panel disposed inside the inner case and having a plurality of through holes; an agitating part disposed between a bottom surface of the inner case and the separation panel and having a magnet and a stirring fan rotating together with the magnet; and a magnetic field generating part disposed outside the outer case and generating a magnetic field to cause the magnet to be rotated.

The bottom surface of the inner case may include: a planar portion on which the agitating part is disposed; and a sloped portion connected to an edge of the planar portion and upwardly sloped in a direction away from the planar portion.

A width of the planar portion may be larger than a width of the agitating part.

An outer edge of the sloped portion may be positioned above the stirring fan.

The separation panel may be supported by the sloped portion and disposed horizontally.

The agitating part may include: a shaft connected to the stirring fan; and a rotor disposed to surround at least a portion of the shaft on a lower side of the stirring fan and having the magnet to rotate the shaft. The magnetic field generating part may include: a stator core disposed to be spaced apart from an outer circumference of the rotor; and a coil provided on the stator core and generating a magnetic field by an alternating current applied thereto.

At least a portion of the planar portion may be depressed downward to form an inner depressed portion, the outer case may have an outer depressed portion corresponding to the inner depressed portion, the heat insulation cavity being provided between the inner depressed portion and the outer depressed portion, the rotor may be disposed in the inner depressed portion, and the magnetic field generating part may be provided on an outer circumference of the outer depressed portion.

The magnet may have a bar shape or a circular shape, and the magnetic field generating part may include: a motor; and an external magnet rotated by the motor to generate a magnetic field.

The cooling and heating cabinet may further include: a rotary shaft penetrating through the agitating part and disposed to be perpendicular to the agitating part.

The cooling and heating cabinet may further include: a lower support portion supporting a lower side of the agitating part; and an upper support portion supporting an upper side of the agitating part, wherein the lower support portion and the upper support portion may have a conical shape having a diameter reduced toward the agitating part.

The cooling and heating cabinet may further include: a guide portion disposed to be perpendicular between the bottom surface of the inner case and the separation panel, wherein the guide portion may have a plurality of auxiliary through holes.

The plurality of through holes may include: an intake hole overlapping the agitating part and allowing air to be intaken from an upper side of the separation panel to a lower side of the separation panel; and a discharge hole facing the sloped portion and allowing air to be discharged from the lower side of the separation panel to the upper side of the separation panel.

The separation panel may have an intake hole group having a plurality of intake holes and a discharge hole group having a plurality of discharge holes, and a pair of discharge hole groups may be spaced apart from each other with the intake hole group interposed therebetween.

The separation panel may have a lattice structure.

Advantageous Effect

According to the present invention, since the storage space is insulated from the outside by the insulating cavity structure of the case, a temperature of the storage space may be maintained constant.

In addition, since the agitating part is rotated by a magnetic field generated by the magnetic field generating part, the agitating part may be rotated, while maintaining the heat insulating cavity structure, and the temperature of the storage space may be evenly distributed by stirring air by the agitating part.

MODE FOR INVENTION

Hereinafter, specific embodiments of the present invention will be described in detail with reference to the accompanying drawings.

Figure 1:
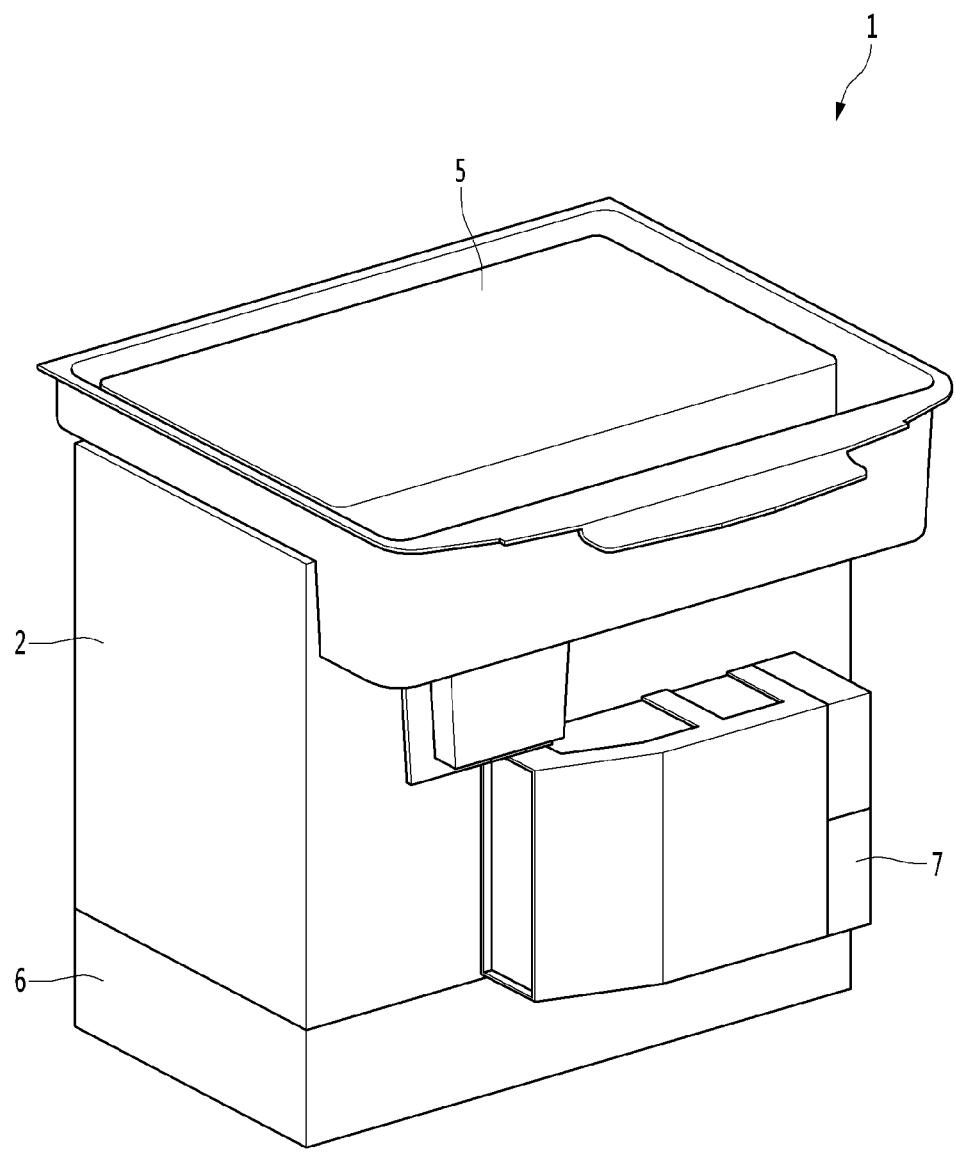
FIG. 1 is a perspective view showing an appearance of a cooling and heating cabinet according to a first embodiment of the present invention.
Figure 2:
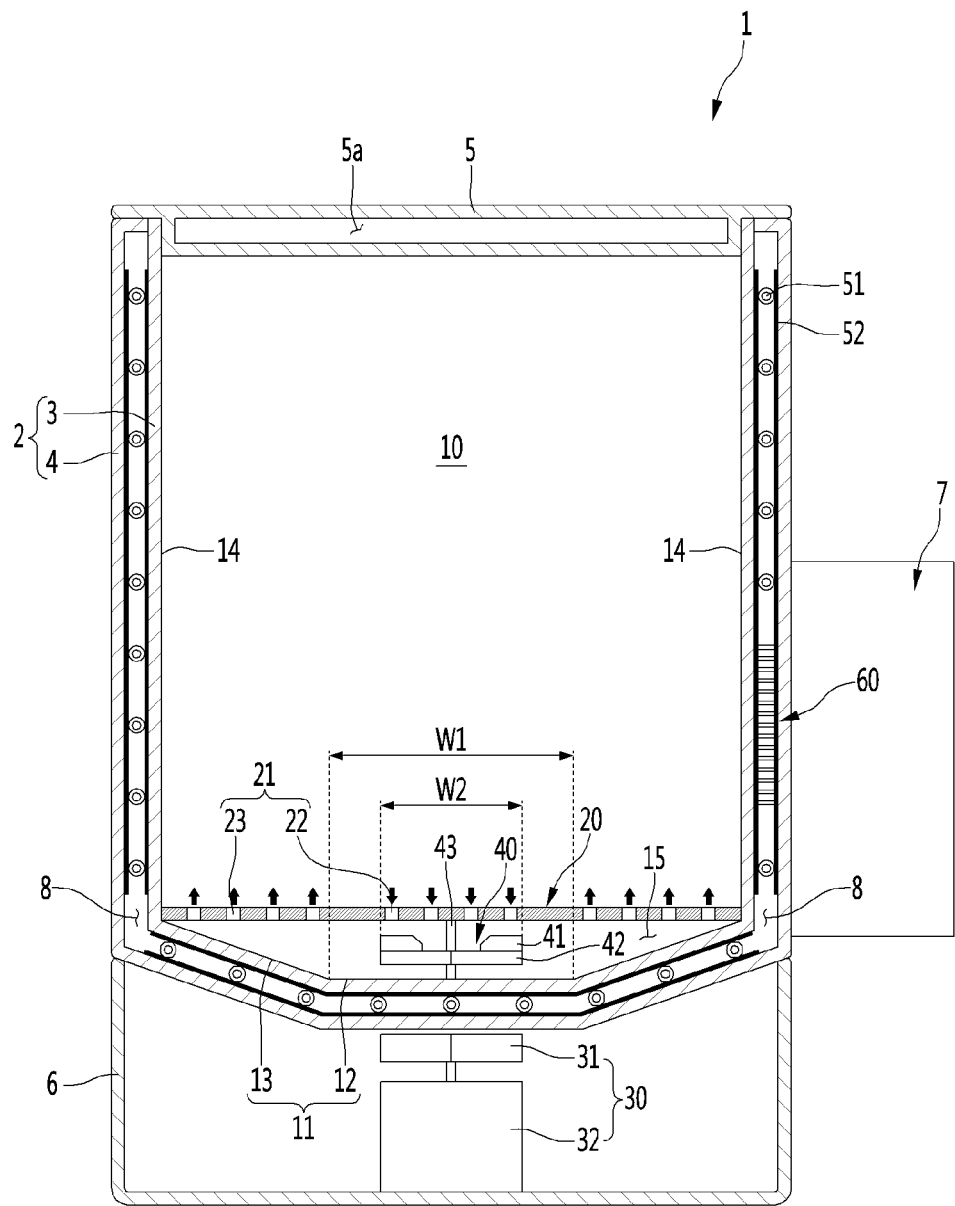
FIG. 2 is a cross-sectional view of a cooling and heating cabinet according to a first embodiment of the present invention.

FIG. 1 is a perspective view showing an appearance of a cooling and heating cabinet according to a first embodiment of the present invention, and FIG. 2 is a cross-sectional view of the cooling and heating cabinet according to the first embodiment of the present invention.

Referring to FIGS. 1 and 2, a cooling and heating cabinet 1 according to the present embodiment includes an inner case 3, an outer case 4, a thermoelectric element module 60, a heat dissipating part 7, a separation panel 20, an agitating part 40, and a magnetic field generating part 30. The cooling and heating cabinet 1 according to the present embodiment may further include a lower case 6.

The case 2 may have a substantially box shape. The case 2 may form an appearance of the cooling and heating cabinet 1.

The case 2 may have a storage space 10 therein. The storage space 10 may store food or the like. Therefore, in order to maintain freshness or the like of food, it is important to keep a temperature of the storage space 10 constant.

One side of the case 2 is opened so that a user may access the storage space 10. For example, an upper surface of the case 2 may be opened.

A cap 5 may be provided on the opened side of the case 2. The cap 5 may cover the one opened side of the case 2.

The cap 5 may be detachably mounted to the case 2 and the user may access the storage space 10 by detaching the cap 5 from the case 2, and thereafter, the user may mount the cap 5 on the case 2 to close the storage space 10.

The cap 5 may be a door hinged to the case 2. Further, when the upper surface of the case 2 is opened, the cap 5 may be a top cover.

A sealing (not shown) may be provided between the cap 5 and the case 2 to thereby prevent cold air from leaking out of the storage space 10.

The cap 5 may have a hermetically closed hollow 5a therein. The hollow 5a may act as a heat insulating material and prevent heat conduction through the cap 5 in a state in which the cap 5 is mounted on the case 2. This may help keep a temperature of the storage space 10 constant.

The case 2 may have a dual-wall structure. In more detail, the case 2 may include an inner case 3 and an outer case 4.

The inner case 3 may have a storage space 10 therein. The inner case 3 may include an inner surface of the case 2.

The outer case 4 may be disposed to surround the inner case 3. The outer case 4 may be spaced apart from the inner case 3 by a predetermined distance.

An empty space may be provided between the inner case 3 and the outer case 4, and the empty space may be a heat insulating cavity 8. The insulating cavity 8 may be in a closed state.

A gas such as air or the like may be present in the heat insulating cavity 8. Alternatively, the heat insulating cavity 8 may be in a vacuum state, and here, the heat insulating cavity 8 may be a vacuum cavity.

A distance between the inner case 3 and the outer case 4, which corresponds to a width of the heat insulating cavity 8, is preferably constant in the entirety of the case 2. However, the present invention is not limited thereto.

The heat insulating cavity 8 may serve as a heat insulating material between the outside of the casing 2 and the internal storage space 10 to maintain the temperature of the storage space 10 constant.

A bottom surface 11 of the inner case 3 may include a planar portion 12 and sloped portion 13. Here, the bottom surface 11 of the inner case 3 may refer to an inner lower surface of the inner case 3.

The planar portion 12 may be a horizontally formed portion of the bottom surface 11. The planar portion 12 is preferably positioned at the center of the bottom surface 11 but is not limited thereto. The planar portion 12 may be formed to extend in a longitudinal direction of the cooling and heating cabinet 1.

The agitating part 40 (to be described later) may be disposed on the planar portion 12. A width W1 of the planar portion 12 may be equal to or larger than a width W2 of the agitating part 40. Here, the width W2 of the agitating part 40 may refer to a diameter of the agitating part 40. Thus, the entirety of the agitating part 40 may be positioned on the planar portion 12.

The sloped portion 13 may be a sloped portion of the bottom surface 11. The sloped portion 13 may be formed to extend in the longitudinal direction of the cooling and heating cabinet 1 as with the planar portion 12.

The sloped portion 13 may be connected to an edge of the planar portion 12. That is, the sloped portion 13 may extend from the edge of the planar portion 12. The sloped portion 13 may be provided as a pair, and each of the sloped portions 13 may be connected to both side edges of the planar portion 12.

The sloped portion 13 may be formed to be sloped upwardly away from the planar portion 12. More specifically, the sloped portion 13 may be sloped in a direction in which a height of the sloped portion 13 increases away from the planar portion 12. That is, the planar portion 12 may be formed at the lowest position of the bottom surface 11 of the inner case 3.

The sloped portions 13 connected to both sides of the planar portion 12 may be sloped in mutually opposite directions.

One side of the sloped portion 13 may be connected to the planar portion 12 and the other side thereof may be connected to a side surface 14 of the inner case 3. Alternatively, a separate auxiliary planar portion (not shown) may be provided between the side surface 14 of the inner case 3 and the sloped portion 13.

An outer edge of the sloped portion 13 may be positioned on an upper side than the stirring fan 41 of the agitating part 40. In this case, the outer edge of the sloped portion 13 may refer to a portion farthest from the planar portion 12 and may be an upper edge.

Accordingly, air discharged in a radial direction from the stirring fan 41 may be reflected upward from the sloped portion 13. That is, the sloped portion 13 may serve to facilitate a flow of a discharge air current.

A bottom surface of the outer case 4 may have a shape corresponding to the bottom surface 11 of the inner case 3. That is, the bottom surface of the outer case 4 may also include a sloped portion and a planar portion. This may be an inevitable structure in order to maintain a certain interval of the heat insulating cavity 8 positioned between the inner case 3 and the outer case 4.

Meanwhile, the thermoelectric element module 60 may be disposed in the heat insulating cavity 8. In more detail, the thermoelectric element module 60 may be disposed in an insulating cavity 8 positioned on a side surface portion or an upper surface portion of the case 2.

One side of the thermoelectric element module 60 may be disposed in contact with the inner case 3 and the other side thereof may be in contact with the outer case 4. Accordingly, the thermoelectric element module 60 may perform heat conduction between the inner case 3 and the outer case 4.

The thermoelectric element module 60 may maintain the storage space 10 at a low temperature in accordance with a refrigerating mode or at a high temperature in accordance with a heating mode according to a current flow direction. In the refrigerating mode and the heating mode, the current flow of the thermoelectric element module 60 may be opposite to each other.

In the refrigerating mode, the thermoelectric element module 60 absorbs heat at an electrode on the inner case 3 side and dissipates heat to an electrode on the outer case 4 side. As a result, the storage space 10 in the inner case 3 may be maintained at a low temperature.

In the heating mode, the thermoelectric element module 60 may absorb heat at the electrode on the outer case 4 side and dissipates heat to the electrode on the inner case 3 side. As a result, the storage space 10 in the inner case 3 may be maintained at a high temperature.

A specific configuration of the thermoelectric element module 60 will be described in detail later.

Meanwhile, the heat insulating cavity 8 may have a heat transfer pipe 51. The heat transfer pipe 51 may further improve heat transfer performance based on the thermoelectric element module 60 between the inner case 3 and the outer case 4.

The heat transfer pipe 51 may be in contact with and connected to the thermoelectric element module 60. The heat transfer pipe 51 may be mounted to surround an outer surface of the inner case 3. A plurality of heat transfer pipes 51 may be provided.

The heat transfer pipe 51 may be disposed in direct contact with the inner case 3 and the outer case 4 and may be disposed between pipe fixing members 52. Hereinafter, a case where the heat transfer pipe is fixed to the pipe fixing member 52 will be described as an example.

The pipe fixing member 52 may be positioned in the heat insulating cavity 8. The pipe fixing member 52 may be disposed between the heat transfer pipe 51 and the inner case 3 and may be disposed between the heat transfer pipe 51 and the outer case 4.

The pipe fixing member 52 may be integrally formed or divided into a plurality of pipes.

The pipe fixing member 52 may be in contact with an outer surface of the heat transfer pipe 51. The pipe fixing member 52 may be in contact with the inner case 3 and the outer case 4.

Since the pipe fixing member 52 fixes the heat transfer pipe 51, it may be easy to install the heat transfer pipe 51 in the heat insulating cavity 8.

The heat transfer pipe 51 and the pipe fixing member 52 may be omitted.

Meanwhile, the heat dissipating part 7 may dissipate heat transferred to the thermoelectric element module 60. The heat dissipating part 7 may be disposed on an outer surface of the case 2. More specifically, the heat dissipating part 7 may be disposed on the outer surface of the outer case 4. The heat dissipating part 7 is preferably disposed on a circumferential surface of the outer case 4.

The heat dissipating part 7 may be disposed at a position corresponding to the thermoelectric element module 60. The thermoelectric element module 60 may be disposed at a position overlapping the heat dissipating part 7. Accordingly, heat dissipated from the thermoelectric element module 60 may be rapidly dissipated by the heat dissipating part 7.

The heat dissipating part 7 may include a heat sink (not shown) including a plurality of cooling fins and a cooling fan (not shown) for increasing heat exchange efficiency of the heat sink.

The lower case 6 may be disposed below the case 2. An outer surface of the lower case 6 may be matched with the outer surface of the case 2.

The lower case 6 may have a box shape whose upper surface is opened. The open upper surface of the lower case 6 may be covered by a lower surface of the case 2. More specifically, the opened upper surface of the lower case 6 may be covered by the lower surface of the outer case 4.

A magnetic field generating part 30, which will be described later, may be disposed inside the lower case 6. A space for accommodating the magnetic field generating part 30 may be provided in the lower case 6.

The magnetic field generating part 30 may be disposed inside the lower case 6. The magnetic field generating part 30 may be disposed between the case 2 and the lower case 6. The magnetic field generating part 30 may be disposed at an outer lower side of the case 2. Therefore, the heat insulating cavity 8 may be positioned between the magnetic field generating part 30 and the agitating part 40.

The magnetic field generating part 30 may be arranged to overlap the agitating part 40. The magnetic field generating part 30 may be disposed at a position corresponding to the agitating part 40.

The magnetic field generating part 30 may include an external magnet 31 and a motor 32. The external magnet 31 may be rotated by driving the motor 32 and may form a rotating magnetic field.

When the external magnet 31 is rotated to form a rotating magnetic field based on driving of the motor 32, the magnet 42 of the agitating part 40 may be rotated by the rotating magnetic field.

The agitating part 40 may be disposed in the inner case 3. The agitating part 40 may be disposed below the separation panel 20 to be described later.

The agitating part 40 may be disposed on the planar portion 12 of the bottom surface 11 of the inner case 3. Here, the agitating part 40 may be disposed in contact with the planar portion 12 and may be disposed to be spaced apart from the planar portion 12.

The agitating part 40 may be disposed to overlap the magnetic field generating part 30. The agitating part 40 may be disposed at a position corresponding to the magnetic field generating part 30.

The agitating part 40 may stir air to move and circulate air in the inner case 3. Accordingly, a temperature of the storage space 10 in the inner case 3 may be evenly distributed and performance of the cooling and heating cabinet 1 may be improved.

The agitating part 40 may include a stirring fan 41 and a magnet 42.

The stirring fan 41 and the magnet 42 may be integrally formed. It is also possible that the magnet 42 is mounted on a stirring body (not shown) formed integrally with the stirring fan 41.

A shape of the magnet 42 is not limited. For example, the magnet 42 may have a rod shape or a circular shape. The magnet 42 may be a bar magnet or a circular magnet.

The magnet 42 may be rotatably disposed. The magnet 42 may be rotated by a rotating magnetic field generated by the magnetic field generating part 30.

The magnet 42 may be provided below the stirring fan 41.

The stirring fan 41 may be rotated together with the magnet 42. The stirring fan 41 may rotate and intake air in an axial direction and discharge air in a radial direction. The stirring fan 41 may stir the air in the inner case 3, while being rotated.

The stirring fan 41 may be disposed to face the sloped portion 13 with respect to a horizontal direction. That is, the stirring fan 41 may be disposed at a position lower than an upper edge of the sloped portion 13. Thus, air discharged from the stirring fan 41 may be reflected from the sloped portion 13 and flow upward.

A detailed configuration of the stirring fan 41 will be described later in detail.

The cooling and heating cabinet 1 according to the present embodiment may further include a rotary shaft 43.

The rotary shaft 43 may be disposed perpendicularly to penetrate through the agitating part 40.

The agitating part 40 may rotate about the rotary shaft 43. When the agitating part 40 is rotated, the rotary shaft 43 itself may not rotate.

The rotary shaft 43 may have one end connected to the separation panel 20 and the other end connected to the bottom surface 11 of the inner case 3. More specifically, the rotary shaft 43 may have one end connected to a lower surface of the separation panel 20 and the other end connected to the planar portion 12. Here, the rotary shaft 43 may be in direct contact with and connected to the separation panel 20 and the planar portion 12, or may be connected thereto with a separate fixing member (not shown) interposed therebetween.

The rotary shaft 43 may also be connected to only any one of the separation panel 20 and the planar portion 12.

The separation panel 20 may be disposed above the agitating part 40. The separation panel 20 may be disposed inside the inner case 3.

The separation panel 20 may be disposed horizontally.

The separation panel 20 may be supported by the sloped portion 13. The separation panel 20 may be disposed to be in contact with the sloped portion 13. More specifically, both edges of the separation panel 20 may be disposed to be in contact with the sloped portion 13. Preferably, the separation panel 20 is disposed to be in contact with an upper end portion of the sloped portion 13.

The separation panel 20 may be supported by a separate support member (not shown) protruding inward from the side surface 14 of the inner case 3, but preferably, the separation panel 20 is disposed to be in contact with the sloped portion 13 to secure the storage space 10 as large as possible.

A width of the separation panel 20 may be equal to the sum of horizontal widths of the planar portion 12 and the sloped portion 13. The width of the separation panel 20 may be equal to a width of the storage space 10.

The separation panel 20 may divide the inside of the inner case 3. More specifically, the separation panel 20 may divide the inside of the inner case 3 into the storage space 10 in which food may be stored and a stirring space accommodation space 15 in which the agitating part 40 is disposed. The storage space 10 may refer to an upper space of the separation panel 20 and the agitating part accommodation space 15 may refer to a lower space of the separation panel 20.

A plurality of through holes 21 may be provided in the separation panel 20. The through holes 21 provided in the separation panel 20 may be formed in a vertical direction. By means of the through holes 21, the separation panel 20 may guide air discharged into the storage space 10 to form a vertical upward air current.

The air in the storage space 10 and the air in the agitating part accommodation space 15 flow to the mutually opposite sides through the through holes 21 formed in the separation panel 20 and the air in the inner case 3 may be circulated. Accordingly, a flow circulation in the inner case 3 may be maximized.

Air may flow from the upper side to the lower side of the separation panel 20 through some of the plurality of through holes 21 and air may flow from the lower side to the upper side of the separation panel 20 through the other of the plurality of through holes 21.

More specifically, the plurality of through holes 21 may include an intake hole 22 and a discharge hole 23.

The intake hole 22 may intake air from the upper side to the lower side of the separation panel 20. That is, when the agitating part 40 is rotated, the air in the storage space 10 may be intaken into the agitating part accommodation space 15 through the intake hole 22.

The intake hole 22 may overlap the agitating part 40. That is, the intake hole 22 may be formed at a position facing the agitating part 40. As a result, air may smoothly flow through the intake hole 22 and manufacturing unnecessary intake holes 22 may be prevented, thereby reducing manufacturing cost or the like.

When the stirring fan 41 rotates, air in the storage space 10 may be intaken into the agitating part accommodation space 15 through the intake hole 22 and intaken in the axial direction of the stirring fan 41.

Air may be discharged through the discharge hole 23 from the lower side to the upper side of the separation panel 20. That is, when the agitating part 40 is rotated, the air in the agitating part accommodation space 15 may be discharged into the storage space 10 through the discharge hole 23.

The discharge hole 23 may overlap with the sloped portion 13. That is, the discharge hole 23 may be formed at a position facing the sloped portion 13. As a result, the flow of air through the discharge hole 23 may be smooth, and unnecessary discharge holes 23 may be prevented from being produced, thereby reducing manufacturing costs and the like.

When the stirring fan 41 rotates, air discharged in the radial direction of the stirring fan 41 may be reflected from the sloped portion 13, and the air reflected by the sloped portion 13 may flow upward and may be discharged to the storage space 10 through the discharge hole 23.

Hereinafter, the operation of the cooling and heating cabinet 1 according to the present embodiment will be described.

When a current is applied to the thermoelectric element module 60 in the refrigeration mode, the electrode of the thermoelectric element module 60 on the inner case 3 side may absorb heat and the electrode on the outer case 4 side may dissipate heat. Here, the heat dissipating part 7 may rapidly dissipate heat emitted from the electrode on the outer case 4 side of the thermoelectric element module 60.

The electrode of the thermoelectric element module 60 on the inner case 3 side may absorb heat to cool the inner case 3. Here, the heat of the inner case 3 may be quickly transferred to the thermoelectric element module 60 by the heat transfer pipe 51 surrounding the outer surface of the inner case 3.

As the inner case 3 is cooled, a temperature of the storage space 10 may be lowered. In addition, the storage space 10 is heat-insulated from the outside due to the structure of the single cavity 8 to maintain a low temperature of the storage space 10.

In the heating mode, a current may be applied to the thermoelectric element module 60 in the opposite direction, and thus, a direction of heat conduction may be reversed.

Meanwhile, when the motor 32 of the magnetic field generating part 30 is driven, the external magnet 31 may rotate to generate a rotating magnetic field. The magnet 42 of the agitating part 40 may be rotated around the rotary shaft 43 together with the stirring fan 41 by the rotating magnetic field.

Here, a magnetic field generated by the magnetic field generating part 30 may reach the agitating part 40 beyond the vacuum cavity 8, and thus, the agitating part 40 may be advantageously rotated, while the structure of the vacuum cavity 8 is maintained.

By the rotation of the stirring fan 41, air in the storage space 10 may be intaken into the agitating part accommodation space 15 through the intake hole 22 of the separation panel 20. The intaken air may be intaken in the axial direction of the stirring fan 41 and discharged in the radial direction.

The air discharged in the radial direction from the stirring fan 41 may be reflected upward from the sloped portion 13 and may be discharged to the storage space 15 through the discharge hole 23.

As a result, the air in the inner case 3 may flow to form a circulating air current and the temperature of the storage space 10 may be evenly distributed. Also, the structure of the sloped portion 13 and the through hole 21 of the separation panel 20 may guide a flow direction of the air to further increase the effect of stirring, and the temperature in the storage space 10 may be distributed rapidly and evenly.

Figure 3:
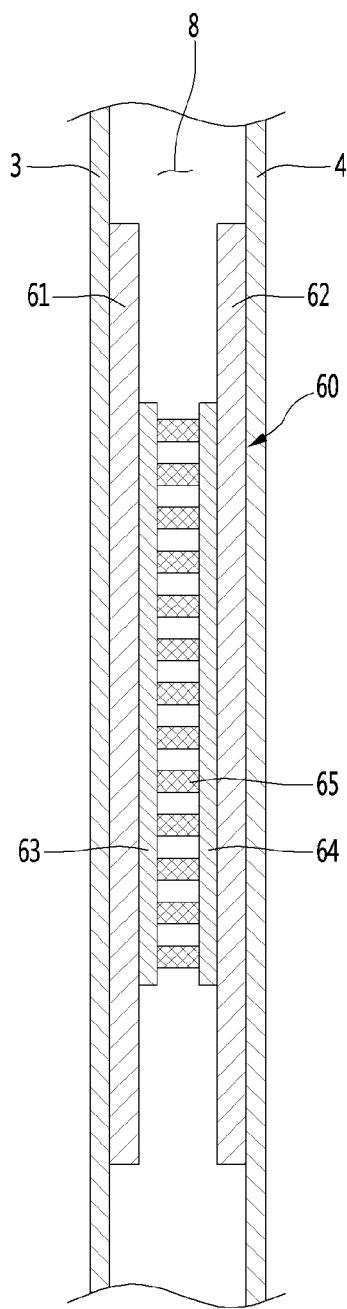
FIG. 3 is a view illustrating a thermoelectric element module according to an example.

FIG. 3 is a view illustrating a thermoelectric element module according to an example.

Hereinafter, a detailed configuration of the thermoelectric element module 60 will be described with reference to FIG. 3.

As described above, the thermoelectric element module 60 may be disposed in the heat insulating cavity 8 and may be disposed such that one side thereof is in contact with the inner case 3 and the other side thereof is in contact with the outer case 4. Heat may be absorbed on the one side of the thermoelectric element module 60 and heat may be dissipated on the other side. Conversely, heat dissipation may be performed on the one side of the thermoelectric element module 60, and heat absorption may be performed on the other side.

The thermoelectric element module 60 may include ceramic substrates 61 and 62, metal electrodes 63 and 64, and a plurality of semiconductor thermoelectric elements 65.

The ceramic substrates 61 and 62 and the metal electrodes 63 and 64 may be arranged perpendicularly.

The ceramic substrates 61 and 62 may include a first ceramic substrate 61 provided in contact with the inner case 3 and a second ceramic substrate 62 provided in contact with the outer case 4.

The first ceramic substrate 61 and the second ceramic substrate 62 may be spaced apart from each other in a facing manner. Sizes of the first ceramic substrate 61 and the second ceramic substrate 62 may be equal.

The metal electrodes 63 and 64 may be disposed between the first ceramic substrate 61 and the second ceramic substrate 62. Sizes of the metal electrodes 63 and 64 may be smaller than the sizes of the ceramic substrates 61 and 62.

The metal electrodes 63 and 64 may be formed of a metal plate, and current may be applied to the metal electrodes 63 and 64. The metal electrodes 63 and 64 may be connected to a DC power source. When connection of the metal electrodes 63 and 64 to the DC power source is reversed, a direction of a current applied to the thermoelectric element module 60 may be reversed.

The metal electrodes 63 and 64 may include a first metal electrode 63 provided in contact with the first ceramic substrate 61 and a second metal electrode 64 provided in contact with the second ceramic substrate 62.

The first metal electrode 63 and the second metal electrode 64 may be spaced apart from each other in a facing manner. Sizes of the first metal electrode 63 and the second metal electrode 64 may be equal.

The plurality of semiconductor thermoelectric elements 65 may include N-type semiconductor elements and P-type semiconductor elements which are alternately arranged. The plurality of semiconductor thermoelectric elements 65 may be alternately connected to the first metal electrode 63 and the second metal electrode 64 through both end portion side surfaces of the semiconductor thermoelectric elements 65, and thus, all the semiconductor elements 33 may be electrically connected in series.

In the refrigerating mode, the thermoelectric element module 60 may absorb heat by the first metal electrode 61 and dissipate heat by the second metal electrode 62. As a result, a temperature of the storage space 10 in the inner case 3 may be maintained low.

In the heating mode, the thermoelectric element module 60 absorbs heat by the second metal electrode 62 and dissipates heat by the first metal electrode 61. As a result, the storage space 10 in the inner case 3 may be maintained at a high temperature.

Figure 4:
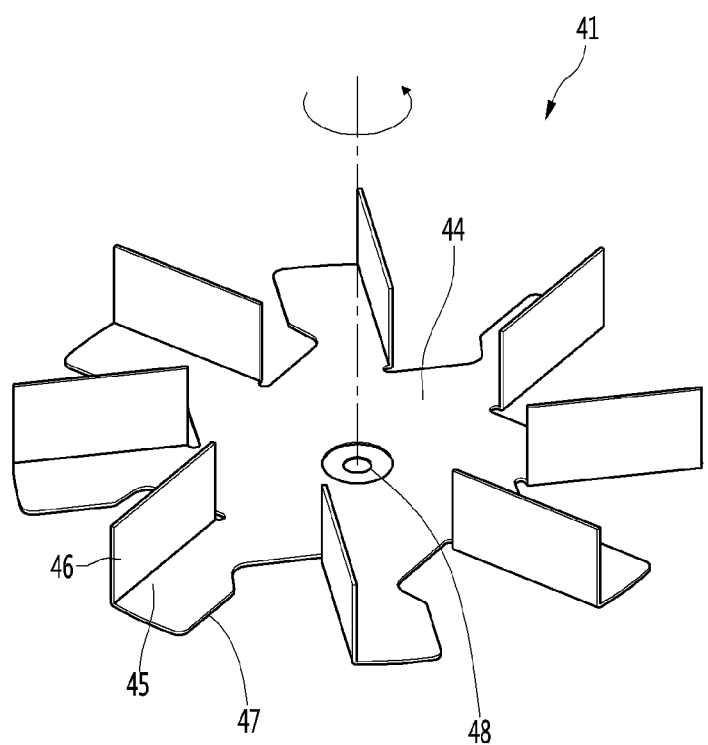
FIG. 4 is a perspective view showing an example of a stirring fan.

FIG. 4 is a perspective view showing an example of a stirring fan.

Hereinafter, a detailed configuration of the stirring fan 41 will be described with reference to FIG. 4.

The stirring fan 41 may include a central portion 44, a peripheral portion 45, a blade 46, and a protrusion 47.

A shape of the central portion 44 is not limited. For example, the central portion 44 may have a substantially disc shape. A hole 48 into which the rotary shaft 43 may be inserted may be formed at the center of the central portion 44.

The peripheral portion 45 may protrude radially from the edge of the central portion 44. A plurality of peripheral portions 45 may be provided, and the peripheral portions 45 may be spaced apart from each other by a predetermined distance.

A blade 46 may be provided on one side of each peripheral portion 45 and a protrusion 47 may be provided on the other side.

The blade 46 may be formed by bending a portion of the peripheral portion 46. The blade 46 may be bent to face upward. The blade 46 may be provided at a predetermined angle with the peripheral portion 45. The blade 46 may have a free curved surface.

The protrusion 47 may protrude from the peripheral portion 45 in a circumferential direction. More specifically, the protrusion 47 may protrude in the circumferential direction of the peripheral portion 45 when the stirring fan 41 rotates. That is, a rotation direction of the stirring fan 41 may rotate so that each blade 46 moves toward the protruding direction of the protrusion 47. For example, the stirring fan 41 as shown in FIG. 4 may rotate in a counterclockwise direction.

The shape and configuration of the stirring fan 41 are merely examples, and the shape and configuration of the stirring fan 41 may be changed as necessary.

Figure 5:
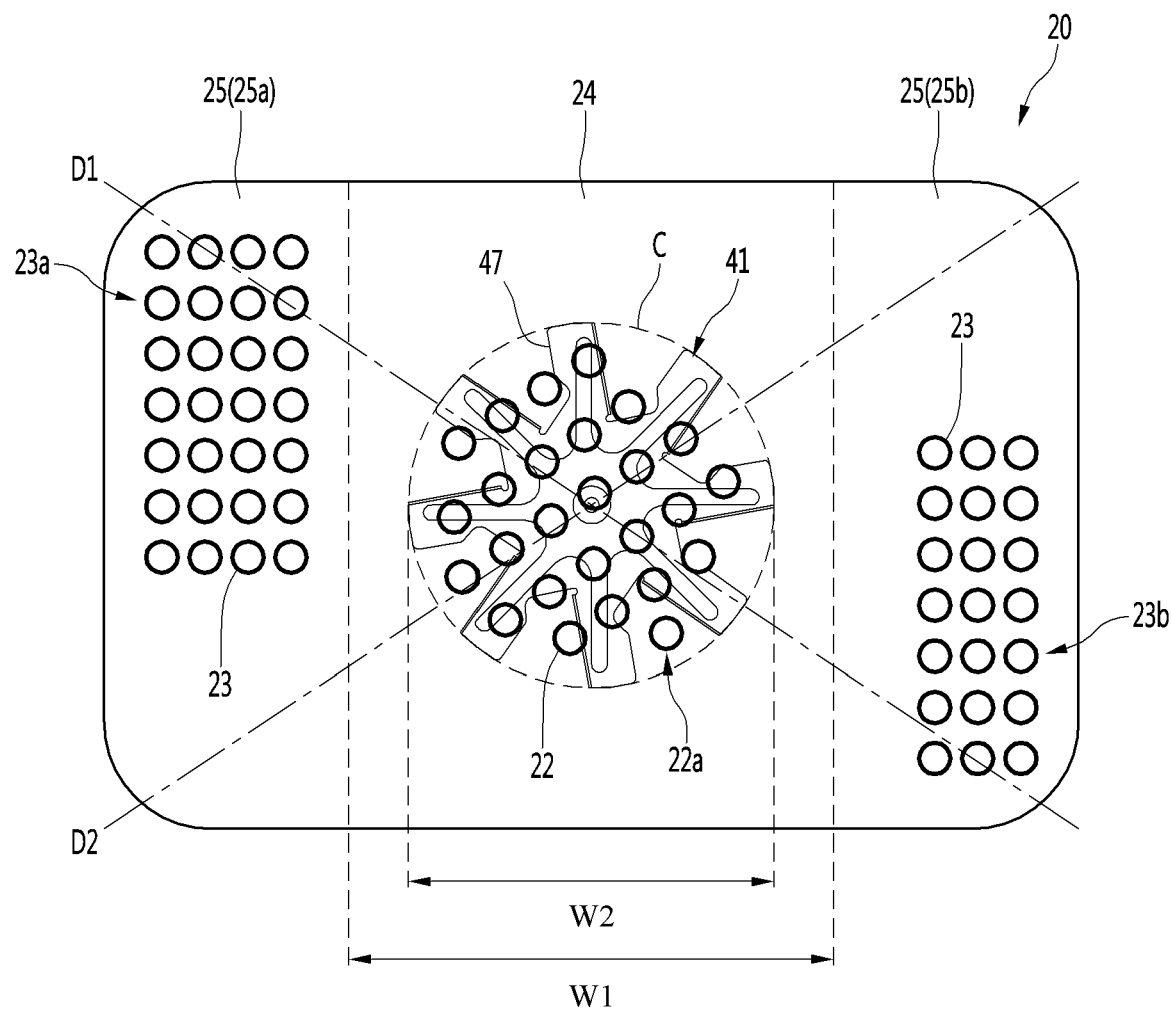
FIG. 5 is a plan view showing an example of a separation panel.

FIG. 5 is a plan view showing an example of a separation panel.

A detailed structure of the separation panel 20 will be described with reference to FIG. 5.

The separation panel 20 may have a substantially rectangular plate shape. The edges of the separation panel 20 may be rounded.

The separation panel 20 includes a first region 24 disposed to face the planar portion 12 of the inner case 3 and a second region 25 disposed to face the sloped portion 13 of the inner case 3.

A width of the first region 24 may be equal to a width W1 of the planar portion 12 and a width of the second region 25 may be equal to a width of the sloped portion 13.

The second region 25 may be provided as a pair and the first region 24 may be positioned between the second regions 25. The second regions 25 may be spaced apart from each other.

As described above, a plurality of through holes 21 may be formed in the separation panel 20, and the through holes 21 may include the intake hole 22 and the discharge hole 23.

The intake hole 22 may be formed in the first region 24 of the separation panel 20. The intake hole 22 may overlap the agitating part 40. More specifically, the intake hole 22 may overlap a virtual circle C formed as the agitating part 40 rotates. A diameter of the virtual circle C may be equal to the width W2 of the agitating part 40.

A plurality of intake holes 22 may gather to form an intake hole group 22a. More specifically, a plurality of intake holes 22 may gather to form a single intake hole group 22a.

The intake hole group 22a may overlap the agitating part 40. The intake hole group 22a may have a substantially circular shape.

The discharge hole 23 may be formed in the second region 25 of the separation panel 20. The discharge hole 23 may be formed all over the second region 25, but in order to prevent formation of an unnecessary discharge hole 23, the discharge hole 23 is preferably formed only in a portion of the second region 25.

A plurality of discharge holes 23 may gather to form at least one pair of discharge hole groups 23a and 23b. For example, a pair of discharge hole groups 23a and 23b may be formed in the separation panel 20, and the discharge hole groups 23a and 23b may be positioned in the second regions 25, respectively.

More specifically, the first discharge hole group 23a may be formed in one second region 25a and the second discharge hole group 23b may be formed in the other second region 25b. That is, the first discharge hole group 23a may be positioned to face one sloped portion 13, and the second discharge hole group 23b may be positioned to face the other sloped portion 13.

The numbers of the discharge holes 23 constituting the first discharge hole group 23a and the second discharge hole group 23b may be different from each other.

The first discharge hole group 23a and the second discharge hole group 23b may be positioned to be eccentric in the mutually opposite directions with respect to the intake hole group 22a. For example, the intake hole group 22a may be positioned at a central portion of the separation panel 20, the first discharge hole group 23a may be positioned at a rear portion of the separation panel 20, and the second discharge hoe group 23b may be positioned at a front portion of the separation panel.

Each of the discharge hole groups 23a and 23b may be formed at a position where only one diagonal line D1 among a pair of diagonal lines D1 and D2 of the discharge panel 20 passes. That is, one diagonal line D1 among the pair of diagonal lines D1 and D2 of the discharge panel 20 may pass through the discharge hole groups 23a and 23b and the other diagonal line D2 may not pass through the discharge hole groups 23a and 23b.

The discharge hole groups 23a and 23b may be formed at positions near the blade 46 and the protrusion 47 of the stirring fan 41 in a width direction of the separation panel 20 when the stirring fan 41 rotates. That is, when the stirring fan 41 is rotated, the blade 46 and the protrusion 47 may move toward the discharge hole groups 23a and 23b with respect to the width direction of the separation panel 20.

Referring to FIG. 5, the stirring fan 41 rotates in a counterclockwise direction. The blades 46 and the protrusion 47 of the stirring fan 41 may move in a direction toward the first discharge hole group 23a on the rear side and may move in a direction toward the second discharge hole group 23b on the front side.

Thus, although the discharge holes 23 are formed only in a portion of the second region 25, rather than being formed in the entire second region 25 of the separation panel 20, the air discharged from the agitating part 40 may be efficiently discharged through the discharge holes 23.

Figure 6:
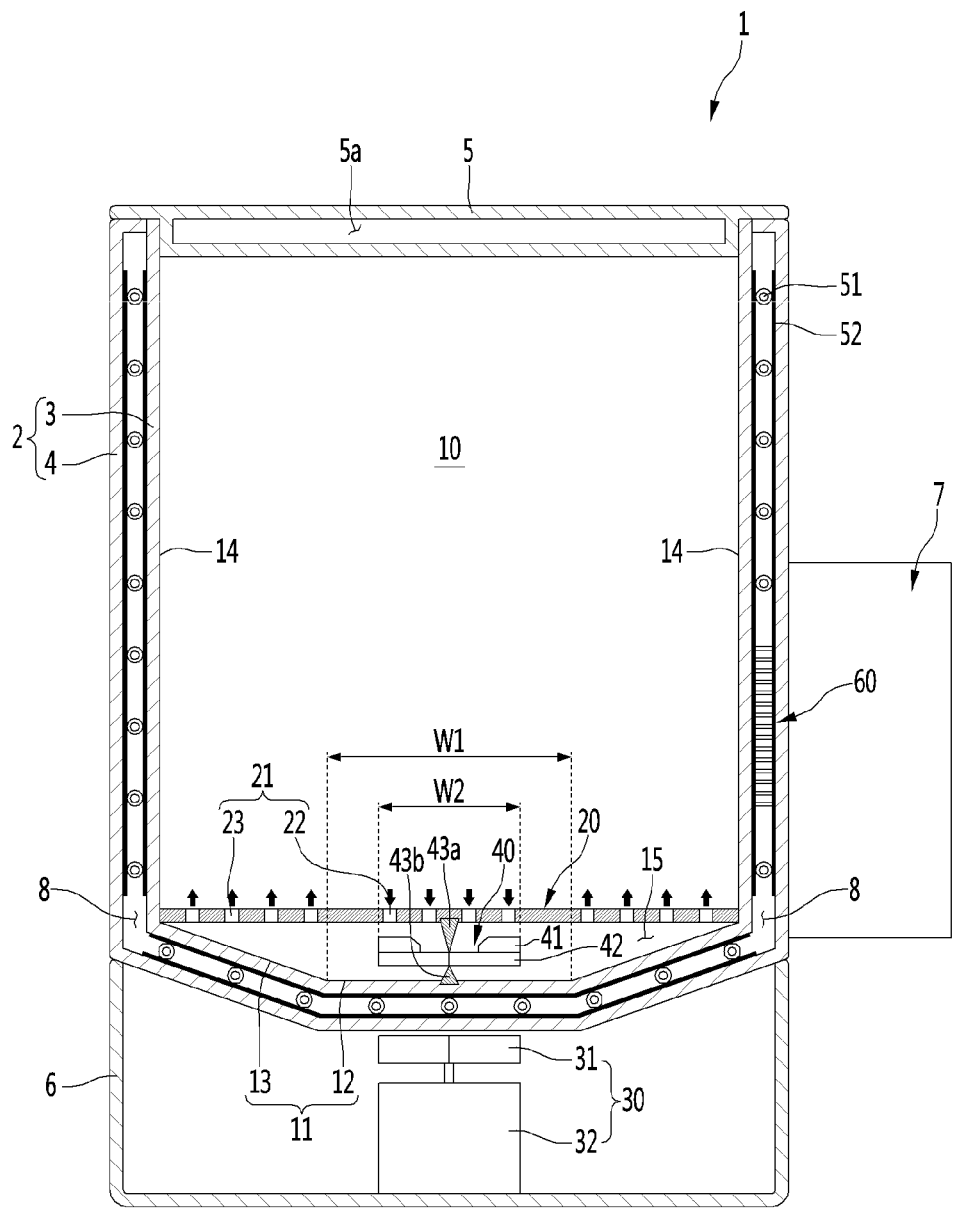
FIG. 6 is a cross-sectional view of a cooling and heating cabinet according to a second embodiment of the present invention.

FIG. 6 is a cross-sectional view of a cooling and heating cabinet according to a second embodiment of the present invention.

The cooling and heating cabinet 1 according to the second embodiment is the same as the cooling and heating cabinet according to the first embodiment except for support portions 43a and 43b, and thus, the same contents as those described above will be omitted and only differences will be mainly described.

The cooling and heating cabinet 1 according to the present embodiment may further include the support portions 43a and 43b instead of the rotary shaft 43.

The support portions 43a and 43b may include an upper support portion 43a and a lower support portion 43b.

The upper support portion 43a may support the agitating part 40 from an upper side and the lower support portion 43b may support the agitating part 40 from a lower side.

The upper support portion 43a and the lower support portion 43b may be arranged in a straight line. The upper support portion 43a and the lower support portion 43b may be disposed to be in contact with the center of the agitating part 40.

A recessed portion (not shown) may be formed at a portion of the upper surface and the lower surface of the agitating part 40 which is in contact with the support portions 43a and 43b so that the agitating part 40 is not separated from the support portions 43a and 43b.

An upper end of the upper support portion 43a may be connected to the separation panel 20 and a lower end thereof may be connected to the agitating part 40. The upper end of the lower support portion 43b may be connected to the agitating part 40 and the lower end may be connected to the planar portion 12.

The support portions 43a and 43b may have a conical shape having a diameter decreased toward the agitating part 40. That is, a diameter of the upper support portion 43a may be decreased from the upper side to the lower side, and a diameter of the lower support portion 43b may be decreased from the lower side to the upper side.

As a result, among both end portions of the support portions 43a and 43b, the end portion connected to the agitating part 40 have a very small diameter, reducing frictional contact between the support portions 43a and 43b and the agitating part 40, and thus, the agitating part 40 may smoothly rotate. At the same time, among both end portions of the support portions 43a and 43b, the end portion connected to the separation panel 20 or the planar portion 12 may have a large diameter so as to be stably fixed to the separation panel 20 or the planar portion 12.

When the agitating part 40 is rotated, the support portions 43a and 43b may not rotate.

Figure 7:
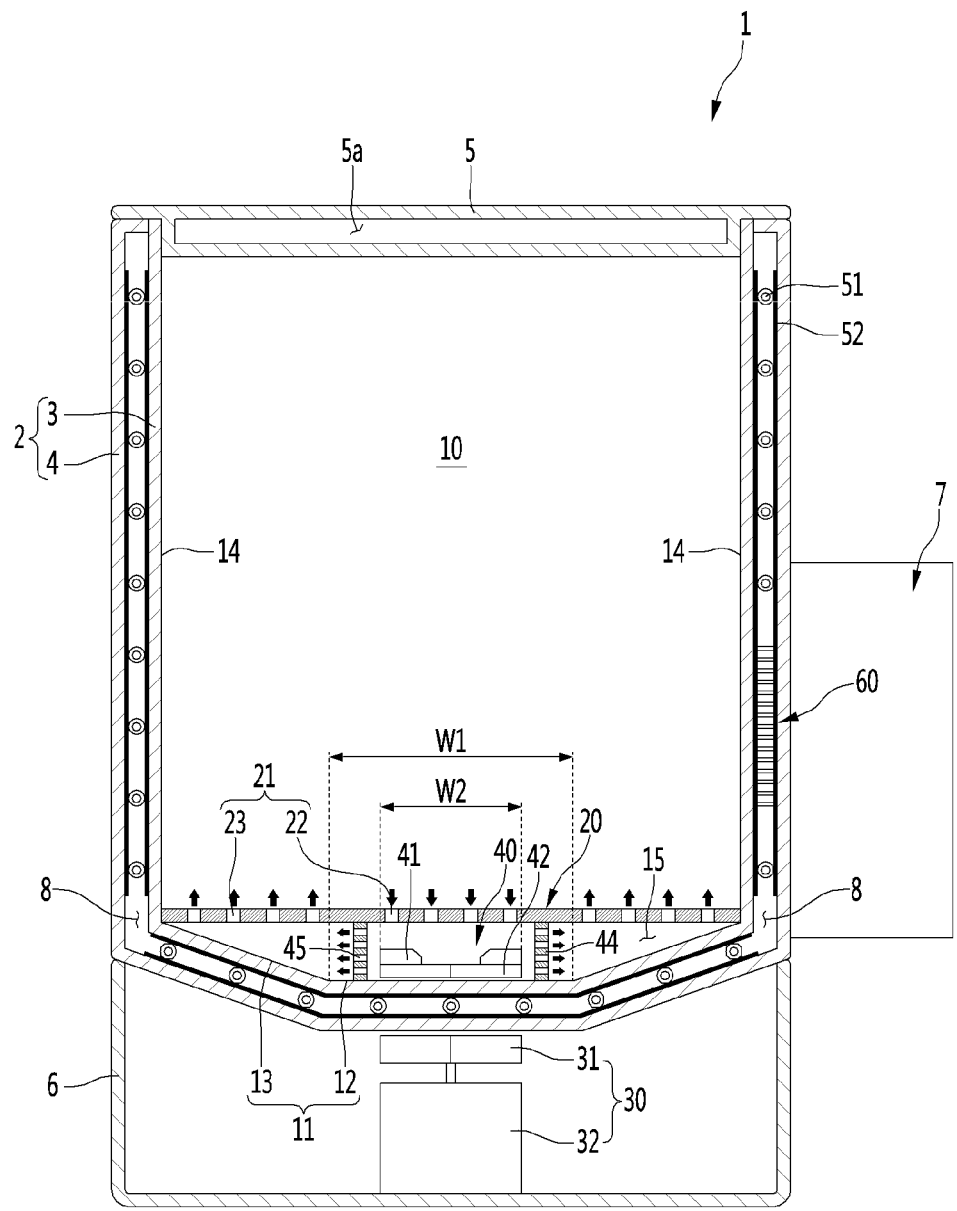
FIG. 7 is a cross-sectional view of a cooling and heating cabinet according to a third embodiment of the present invention.

FIG. 7 is a cross-sectional view of a cooling and heating cabinet according to a third embodiment of the present invention.

The cooling and heating cabinet 1 according to the third embodiment is the same as the cooling and heating cabinet according to the first embodiment except for a guide portion 44, and thus, the same contents as those described above will be omitted and only differences will be mainly described.

The cooling and heating cabinet 1 according to the present embodiment may further include the guide portion 44.

The guide portion 44 may have a hollow cylindrical shape. The guide portion 44 may be spaced apart from an outer circumference of the agitating part 40 and surround the agitating part 40.

Alternatively, the guide portion 44 may be provided as a pair of partition walls arranged to extend in a longitudinal direction of the cooling and heating cabinet 1. The agitating part 40 may be positioned between the pair of guide portions 44.

A space in which the agitating part 40 is disposed may be formed in the guide portion 44.

The guide portion 44 may be perpendicularly disposed between the separation panel 20 and the bottom surface 11 of the inner case 3. More specifically, the guide portion 44 may be disposed perpendicularly between the separation panel 20 and the planar portion 12.

An upper portion of the guide portion 44 may be in contact with the separation panel 20 and a lower portion thereof may be in contact with the planar portion 12.

As described above, the separation panel 20 may be supported by the sloped portions 13 at both ends thereof. Here, since the central portion of the separation panel 20 is not supported, a sagging phenomenon may occur at the central portion of the separation panel 20. Also, there is a possibility that food or the like will fall and hit the separation panel 20 to damage the separation panel 20. The guide portion 44 may advantageously prevent such a possibility by supporting the central portion of the separation panel 20.

A plurality of auxiliary through holes 45 may be provided in the guide portion 44. The auxiliary through hole 45 may be provided in a horizontal direction. By the auxiliary through hole 45, the guide portion 44 may guide air discharged from the agitating part 40 to form a horizontal air current.

The guide portion 44 may be disposed to be in contact between the intake hole 22 and the discharge hole 23 of the separation panel 20. Accordingly, the air in the storage space 10 may flow into the guide portion 44 through the intake hole 22, may flow in a diameter direction of the agitating part 40 through the auxiliary through hole 45, and may be reflected from the sloped portion 13 so as to be discharged to the discharge hole 23.

In addition, the guide portion 44 may prevent the agitating part 40 from being released from a predetermined position.

Figure 8:
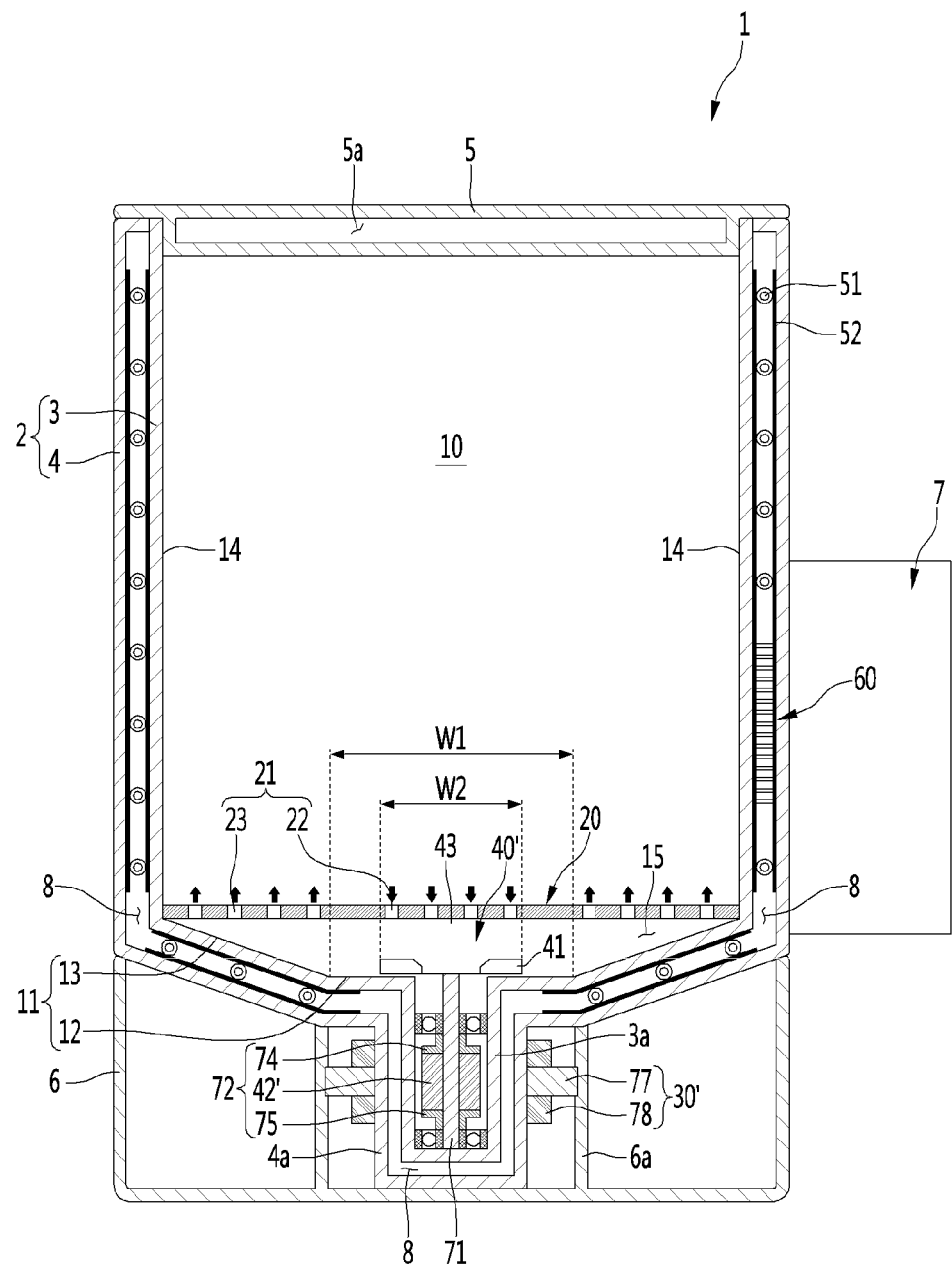
FIG. 8 is a cross-sectional view of a cooling and heating cabinet according to a fourth embodiment of the present invention.

FIG. 8 is a cross-sectional view of a cooling and heating cabinet according to a fourth embodiment of the present invention.

Hereinafter, the same contents as those described above will be omitted and only differences will be mainly described.

An inner depressed portion 3a may be provided in the inner case 3 of the cooling and heating cabinet 1 according to the present embodiment. The inner depressed portion 3a may be formed such that at least a portion of the planar portion 12 is depressed downward.

The outer case 4 may have an outer depressed portion 4a corresponding to the inner depressed portion 3a. At least a portion of the inner depressed portion 3a may be positioned inside the outer depressed portion 4a.

The inner depressed portion 3a and the outer depressed portion 4a may have a hollow cylindrical shape.

The inner depressed portion 3a and the outer depressed portion 4a may be spaced apart from each other by a predetermined distance. The heat insulating cavity 8 may be positioned between the inner depressed portion 3a and the outer depressed portion 4a. Therefore, the cooling and heating cabinet 1 according to the present embodiment may also maintain heat insulating performance by the structure of the heat insulating cavity 8.

A vertical protrusion 6a may be provided in the lower case 6 of the cooling and heating cabinet 1 according to the present embodiment. The vertical protrusion 6a may be arranged to surround a circumference of a magnetic field generating part 30'. The vertical protrusion 6a may be a housing of an integral motor.

The vertical protrusion 6a may have a hollow cylindrical shape. The vertical protrusion 6a may protrude perpendicularly upward from a lower surface of the lower case 6.

An upper end of the vertical protrusion 6a may be in contact with the lower surface of the case 2. More specifically, the upper end of the vertical protrusion 6a may be in contact with the lower surface of the outer case 4. Accordingly, the vertical protrusion 6a may serve to support the case 2 from below.

An agitating part 40' of the cooling and heating cabinet 1 according to the present embodiment may include a stirring fan 41, a shaft 71 and a rotor 72.

The stirring fan 41 may be positioned outside the inner depressed portion 3a. The stirring fan 41 may be positioned above the inner depressed portion 3a.

The shaft 71 may be connected to the stirring fan 41 and the stirring fan 41 may rotate together with the shaft 71. The shaft 71 may be connected to a lower side of the stirring fan 41.

The shaft 71 may be disposed perpendicularly. At least a portion of the shaft 71 may be positioned inside the inner depressed portion 3a.

A position of the shaft 71 may be fixed by a bearing. When the stirring fan 41 rotates, the shaft 71 may rotate together.

The rotor 72 may be disposed to surround at least a portion of the shaft 71 on a lower side of the stirring fan 41 and may be positioned inside the inner depressed portion 3a.

The rotor 72 may rotate together with the shaft 71.

The rotor 72 may include a magnet 42' and a pair of end plates 74 and 75.

The magnet 42' may be arranged to extend up and down.

An upper end of the magnet 42' is supported by the first end plate 74, and a lower end of the magnet 42' is supported by the second end plate 75. That is, the end plates 74 and 75 may prevent the magnet 42' from moving up and down.

The magnet 42' may be rotated by a rotating magnetic field generated by the magnetic field generating part 30', whereby the agitating part 40 may rotate as a whole.

Meanwhile, the magnetic field generating part 30' of the cooling and heating cabinet 1 according to the present embodiment may be provided on the outer circumference of the outer depressed portion 4a. The heat insulating cavity 8 may be positioned between the magnetic field generating part 30' and the rotor 72.

The magnetic field generating part 30' of the cooling and heating cabinet 1 according to the present embodiment may include a stator core 77 and a coil 78.

The stator core 77 may be disposed to be spaced apart from an outer circumference of the rotor 72. The stator core 77 may be fixed to a vertical protrusion 6a.

The coil 78 may be provided in the stator core 77.

An alternating current may be applied to the coil 78 to generate a rotating magnetic field. The magnet 42' of the rotor 72 may be rotated by the rotating magnetic field.

Here, the magnetic field generated by the coil 78 of the magnetic field generating part 30 may reach the rotor 72 beyond the vacuum cavity 8, so that the agitating part 40 may be advantageously rotated, while the structure of the vacuum cavity 8 is maintained.

The agitating part 40' and the magnetic field generating part 30' may be a case-integrated type motor. That is, the cooling and heating cabinet apparatus 1 according to the present embodiment may be a cooling and heating cabinet apparatus including an integrated motor.

Figure 9:
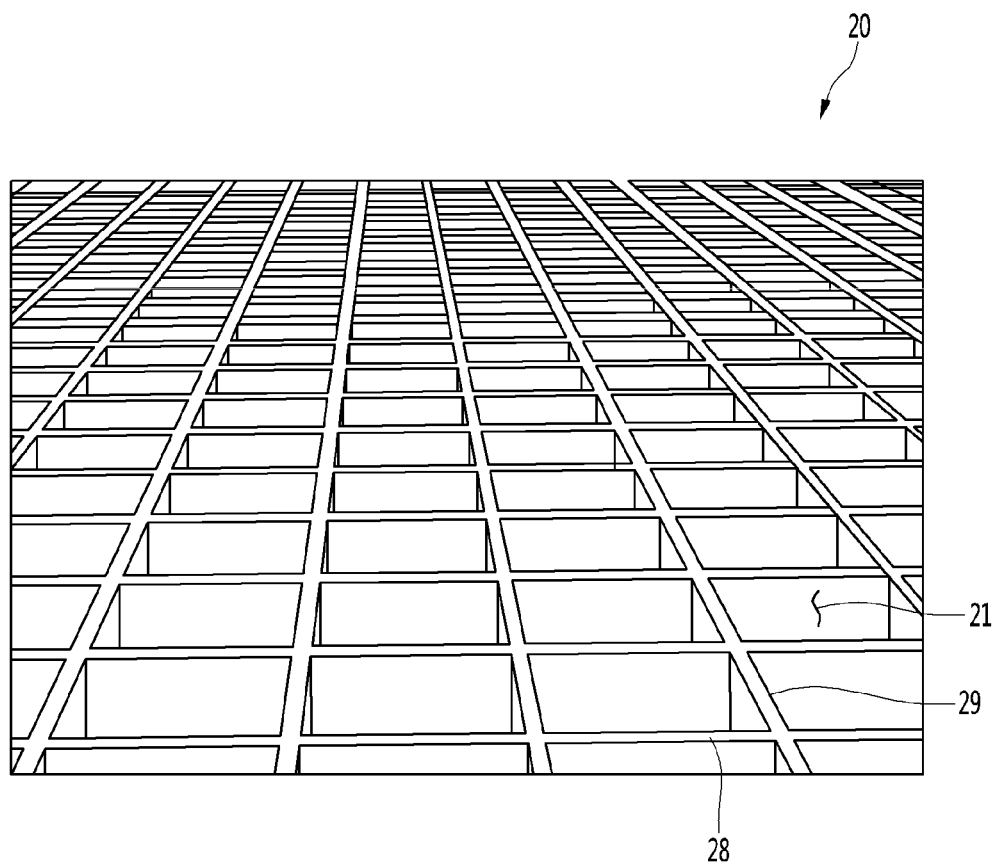
FIG. 9 is a view showing another example of a separation panel.

FIG. 9 is a view showing another example of a separation panel.

The separation panel 20 may have a lattice structure. In this case, the discharge hole and the intake hole may not be distinguished from each other in the through holes 21 provided in the separation panel 21, but the separation panel 20 may be simply manufactured and the area of the through holes is large.

The separation panel 20 may include a plurality of first ribs 28 and a plurality of second ribs 29. The first ribs 28 and the second ribs 29 may cross each other at right angles.

The plurality of first ribs 28 may be arranged in parallel and spaced apart from each other by the same spacing. The plurality of second ribs 29 may be arranged in parallel and spaced apart from each other by the same spacing.

Each through hole 21 may be defined as a space surrounded by a pair of first ribs 28 adjacent to each other and a pair of second ribs 29 adjacent to each other.

In addition, the separation panel 20 may also have a mesh structure.

The above description is only an example describing a technological scope of the present invention. Various changes, modifications, and replacements may be made by those in the art without departing from the spirit and scope of the present invention.

Therefore, the embodiments disclosed above and in the accompanying drawings should be considered in a descriptive sense only and not for limiting the technological scope. The technological scope of the present invention is not limited by the embodiments and the accompanying drawings.

The spirit and scope of the present invention should be interpreted by the appended claims and encompass all equivalents falling within the scope of the appended claims.

The invention claimed is:

1. A cooling and heating cabinet comprising:
    an inner case that defines a storage space therein;
    an outer case that surrounds at least a portion of the inner case and that is spaced apart from the inner case to thereby define a heat insulation cavity between the outer case and the inner case;
    a thermoelectric module disposed in the heat insulation cavity;
    a separation panel that is disposed inside of the inner case and that defines a plurality of through holes;
    an agitating part disposed between a bottom surface of the inner case and the separation panel, the agitating part comprising a magnet and a stirring fan configured to rotate together with the magnet; and
    a motor disposed outside of the outer case and configured to generate a magnetic field to cause rotation of the magnet.

2. The cooling and heating cabinet of claim 1, wherein:
    the bottom surface of the inner case comprises:
        a planar portion on which the agitating part is disposed; and
        a sloped portion connected to an edge of the planar portion and inclined upward with respect to the planar portion in a direction away from the planar portion.

3. The cooling and heating cabinet of claim 2, wherein:
a width of the planar portion is greater than a width of the agitating part.

4. The cooling and heating cabinet of claim 2, wherein:
an outer edge of the sloped portion is positioned vertically above the stirring fan.

5. The cooling and heating cabinet of claim 2, wherein:
the separation panel is supported by the sloped portion and extends horizontally in the inner case.

6. The cooling and heating cabinet of claim 2, wherein:
the agitating part comprises:
a shaft connected to the stirring fan, and
a rotor that surrounds at least a portion of the shaft and that is disposed at a lower side of the stirring fan, the rotor comprising the magnet configured to rotate the shaft, and
the motor comprises:
  a stator core spaced apart from an outer circumference of the rotor, and
  a coil disposed at the stator core and configured to generate the magnetic field based on an alternating current applied to the coil.

7. The cooling and heating cabinet of claim 6, wherein:
at least a portion of the planar portion is depressed downward relative to the sloped portion to thereby define an inner depressed portion configured to receive the rotor,
the outer case comprises an outer depressed portion corresponding to the inner depressed portion, the heat insulation cavity extending between the inner depressed portion and the outer depressed portion, and
the motor is disposed at an outer circumference of the outer depressed portion.

8. The cooling and heating cabinet of claim 2, wherein:
the plurality of through holes comprises:
  an intake hole that overlaps the agitating part and that is configured to receive air from an upper side of the separation panel to a lower side of the separation panel, and
  a discharge hole that faces the sloped portion and that is configured to discharge air from the lower side of the separation panel to the upper side of the separation panel.

9. The cooling and heating cabinet of claim 8, wherein:
the separation panel has an intake hole group comprising a plurality of intake holes including the intake hole and a discharge hole group comprising a plurality of discharge holes including the discharge hole, and
the discharge hole group comprises a pair of discharge hole groups that are spaced apart from each other, and the intake hole group is interposed between the pair of discharge hole groups.

10. The cooling and heat cabinet of claim 9, wherein:
the intake hole group is disposed in a center region of the separation panel, and
the pair of discharge hole groups are disposed along a diagonal direction of the separation panel crossing the center region.

11. The cooling and heating cabinet of claim 1, wherein the magnet has a bar shape or a circular shape.

12. The cooling and heating cabinet of claim 11, further comprising:
a rotary shaft that penetrates the agitating part and that extends in a direction perpendicular to an upper surface of the agitating part.

13. The cooling and heating cabinet of claim 11, further comprising:
a lower support portion that supports a lower side of the agitating part; and
an upper support portion that supports an upper side of the agitating part,
wherein each of the lower support portion and the upper support portion has a conical shape having a diameter decreasing toward the agitating part.

14. The cooling and heating cabinet of claim 11, further comprising:
a guide portion that is disposed between the bottom surface of the inner case and the separation panel and that extends in a direction perpendicular to the bottom surface of the inner case and the separation panel,
wherein the guide portion defines a plurality of auxiliary through holes.

15. The cooling and heating cabinet of claim 1, wherein:
the separation panel has a lattice structure that defines the plurality of through holes.

16. The cooling and heat cabinet of claim 1, wherein:
the separation panel comprises a plurality of first ribs and a plurality of second ribs,
each of the plurality of first ribs crosses each of the plurality of second ribs, and
each of the plurality of through holes is defined by two of the plurality of first ribs and two of the plurality of second ribs.

17. The cooling and heat cabinet of claim 1, wherein:
the outer case surrounds lateral side surfaces of the inner case and the bottom surface of the inner case, and
the heat insulation cavity extends along the lateral side surfaces of the inner case and the bottom surface of the inner case.

18. The cooling and heat cabinet of claim 1, wherein:
the thermoelectric module contacts each of the inner case and the outer case, and
the thermoelectric module is configured to, in a refrigerating mode, absorb heat from the inner case and dissipate the heat to the outer case to thereby maintain a temperature inside of the inner case.

19. The cooling and heat cabinet of claim 1, wherein:
the thermoelectric module contacts each of the inner case and the outer case, and
the thermoelectric module is configured to, in a heating mode, absorb heat from the outer case and dissipate the heat to the inner case to thereby maintain a temperature inside of the inner case.

20. The cooling and heating cabinet of claim 1, wherein the thermoelectric module is configured to:
in a refrigerating mode, absorb inner heat from the inner case and dissipate the inner heat to the outer case to thereby maintain a first temperature inside of the inner case; and
in a heating mode, absorb outer heat from the outer case and dissipate the outer heat to the inner case to thereby maintain a second temperature inside of the inner case that is greater than the first temperature.

21. The cooling and heating cabinet of claim 1, further comprising:
an external magnet configured to be rotated by the motor to thereby generate the magnetic field.

* * * * *